United States Patent [19]

Seiler

[11] Patent Number: 5,136,028
[45] Date of Patent: Aug. 4, 1992

[54] REACTIVE AZO DYES

[75] Inventor: Herbert Seiler, Riehen, Switzerland
[73] Assignee: Ciba-Geigy Corporation, Ardsley, N.Y.
[21] Appl. No.: 612,733
[22] Filed: Nov. 9, 1990

[30] Foreign Application Priority Data

Nov. 14, 1989 [CH] Switzerland ................. 4086/89

[51] Int. Cl.$^5$ .................. C09B 62/085; C09B 67/26; D06P 1/382
[52] U.S. Cl. .................. 534/632; 534/638; 534/887; 8/527; 8/528; 8/549
[58] Field of Search ................. 534/638, 632

[56] References Cited

U.S. PATENT DOCUMENTS 3,261,826  7/1966  Andrew ................. 534/632
4,578,457  3/1986  Seiler ................. 534/632

FOREIGN PATENT DOCUMENTS 0014844   9/1980  European Pat. Off. .
50-94028   7/1975  Japan .
PL94744    4/1976  Poland .
836248     6/1960  United Kingdom .
899376     6/1962  United Kingdom .
1101914    2/1968  United Kingdom .
1566921    5/1980  United Kingdom .
1577498   10/1980  United Kingdom .

OTHER PUBLICATIONS

Chem. Abstr 94: 4942 (1981).
Chem. Abstr 83: 207560p (1975).

Primary Examiner—Mary C. Lee
Assistant Examiner—Fiona T. Powers
Attorney, Agent, or Firm—Marla J. Mathias; Edward McC. Roberts

[57] ABSTRACT

Novel reactive dyes of formula

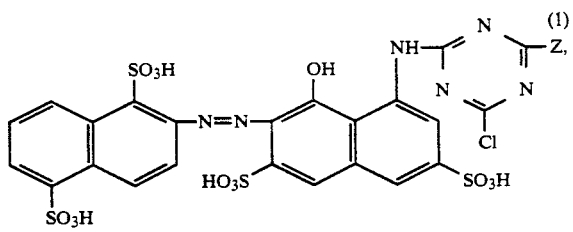

wherein Z is a radical of formula

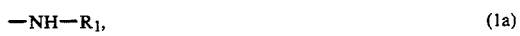 (1a)

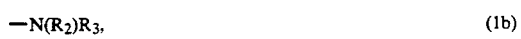

(1b)

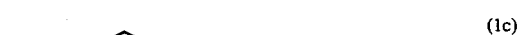

(1c)

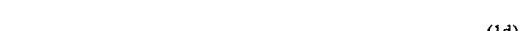

(1d)

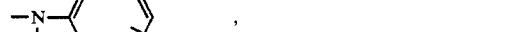

(1e)

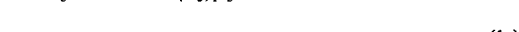

(1f)

and $R_1$, $R_2$, $R_3$, $(R_4)_{2-3}$, $(R_5)_{1-3}$, $R_7$ and $(R_8)_{1-3}$ are as defined in claim 1, give intense red dyeings and prints of good fastness properties on cellulosic fibres.

4 Claims, No Drawings

REACTIVE AZO DYES

Reactive dyes are used extensively for dyeing and printing textile fibre materials. Although a great number of reactive dyes having different properties and for different utilities are available at the present time, the current state of the art is often not entirely satisfactory in view of the exacting requirements with respect to suitability for specific dyeing processes and to the fastness properties of the dyeings obtained.

It is the object of the present invention to provide novel reactive dyes which are suitable for dyeing and printing processes and which have a high degree of fixation and at the same time good washing off properties with respect to unfixed dye. The dyes shall also have good allround fastness properties and, in particular, have a shade in the red range. It has been found that the novel dyes defined below substantially meet these requirements.

Specifically, the invention relates to reactive dyes of formula

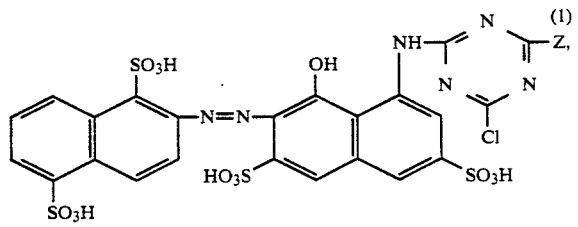
(1)

wherein Z is a radical of formula

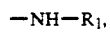 (1a)

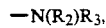 (1b)

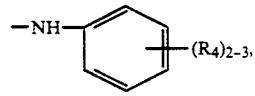 (1c)

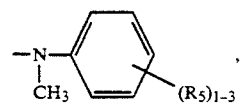 (1d)

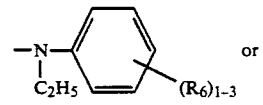 or (1e)

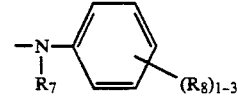 (1f)

and $R_1$ is $C_1$–$C_6$alkyl which is substituted by $C_1$–$C_4$alkoxy, hydroxy-$C_2$–$C_4$alkoxy, HO—(CH$_2$CH$_2$—O)$_{2-4}$—, $C_2$–$C_5$alkanoyl, $C_1$–$C_4$alkoxycarbonyl, $C_1$–$C_4$alkylcarbonyloxy, cyano, halogen or sulfato, $R_2$ is $C_1$–$C_6$alkyl which may be substituted by $C_1$–$C_4$alkoxy, hydroxy-$C_2$–$C_4$alkoxy, HO—(CH$_2$CH$_2$—O)$_{2-4}$—, $C_1$–$C_4$alkoxycarbonyl, $C_2$–$C_5$alkanoyl, $C_1$–$C_4$alkylcarbonyloxy, carboxy, cyano, halogen, sulfo or sulfato, $R_3$ is $C_1$–$C_6$alkyl which is substituted by hydroxy, $C_1$–$C_4$alkoxy, hydroxy-$C_2$–$C_4$alkoxy, $C_2$–$C_5$alkanoyl, $C_1$–$C_4$alkoxycarbonyl, $C_1$–$C_4$alkylcarbonyloxy, carboxy, cyano, halogen, sulfo or sulfato, (R$_4$)$_{2-3}$ denotes 2 or 3 substituents $R_4$, independently of one another selected from the group consisting of $C_1$–$C_4$alkyl, $C_1$–$C_4$alkoxy, halogen and sulfo, (R$_5$)$_{1-3}$ denotes 1 to 3 substituents $R_5$, independently of one another selected from the group consisting of hydrogen, $C_1$–$C_4$alkyl, $C_1$–$C_4$alkoxy, carboxy and halogen, (R$_6$)$_{1-3}$ is either a substituent $R_6$ selected from the group consisting of $C_2$–$C_4$alkyl, $C_1$–$C_4$alkoxy, carboxy and halogen, or denotes 2 or 3 substituents $R_6$, independently of one another selected from the group consisting of $C_1$–$C_4$alkyl, $C_1$–$C_4$alkoxy, carboxy and halogen, $R_7$ is $C_1$–$C_4$alkyl which is substituted by halogen, hydroxy, cyano, carboxy, $C_1$–$C_4$alkoxy, hydroxy-$C_2$–$C_4$alkoxy, sulfo or sulfato, and (R$_8$)$_{1-3}$ denotes 1 to 3 substituents $R_8$, independently of one another selected from the group consisting of hydrogen, $C_1$–$C_4$alkyl, $C_1$–$C_4$alkoxy, carboxy and halogen.

$R_1$, $R_2$ and $R_3$ defined as $C_1$–$C_6$alkyl may suitably be methyl, ethyl, isopropyl, n-propyl, n-butyl, sec-butyl, isobutyl, tert-butyl, n-pentyl or n-hexyl, and $R_1$ and $R_3$ carry the cited substituents as indicated, and $R_2$ may carry these substituents, while $C_1$–$C_4$alkoxy may be methoxy, ethoxy, isopropoxy, n-propoxy and n-butoxy; hydroxy-$C_2$–$C_4$alkoxy may be β-hydroxyethoxy, β-hydroxypropoxy and γ-hydroxypropoxy; $C_1$–$C_4$alkoxycarbonyl may be methoxycarbonyl and ethoxycarbonyl; $C_1$–$C_4$alkylcarbonyloxy may be acetoxy and propionyloxy; $C_2$–$C_5$alkanoyl may be acetyl and propionyl; halogen may be fluoro, bromo and, preferably, chloro; and HO—(CH$_2$CH$_2$—O)$_{2-4}$— may be HO—(CH$_2$CH$_2$—O)$_2$—, HO—(CH$_2$CH$_2$—O)$_3$— and HO—(CH$_2$CH$_2$—O)$_4$—.

$R_4$, $R_5$, $R_6$, $R_7$ and $R_8$ defined as $C_1$–$C_4$alkyl may suitably be methyl, ethyl, isopropyl, n-propyl, sec-butyl, isobutyl, tert-butyl and n-butyl, and $R_7$ is substituted as indicated above, while for $C_1$–$C_4$alkoxy, halogen and hydroxy-$C_2$–$C_4$alkoxy those substituents indicated above in respect of the alkyl radical $R_1$ are suitable.

$R_4$, $R_5$, $R_6$ and $R_8$ defined as $C_1$–$C_4$alkoxy may suitably be methoxy, ethoxy, isopropoxy, n-propoxy, sec-butoxy, isobutoxy, tert-butoxy and n-butoxy.

$R_4$, $R_5$, $R_6$ and $R_8$ defined as halogen may suitably be fluoro, bromo and, preferably, chloro.

Preferred reactive dyes of formula (1) are those wherein

Z is a radical of formula (1a), and $R_1$ is $C_1$–$C_4$alkyl which is substituted by hydroxy-$C_2$–$C_4$alkoxy, HO—(CH$_2$CH$_2$—O)$_{2-4}$— or sulfato;

Z is a radical of formula (1b), and $R_2$ is $C_1$–$C_4$alkyl which may be substituted by hydroxy-$C_2$–$C_4$alkoxy, HO—(CH$_2$CH$_2$—O)$_{2-4}$—, sulfo or sulfato, and $R_3$ is $C_1$–$C_4$alkyl which is substituted by hydroxy, hydroxy-$C_2$–$C_4$alkoxy, HO—(CH$_2$CH$_2$—O)$_{2-4}$—, sulfo or sulfato;

Z is a radical of formula (1c), and (R$_4$)$_{2-3}$ denotes 2 or 3 substituents $R_4$, independently of one another selected from the group consisting of $C_1$–$C_2$alkyl, $C_1$–$C_2$alkoxy, chloro and sulfo;

Z is a radical of formula (1d), and (R$_5$)$_{1-3}$ denotes 1 to 3 substituents, independently of one another selected from the group consisting of $C_{1-2}$alkyl, $C_1$–$C_2$alkoxy, carboxy and chloro;

Z is a radical of formula (1e), and (R$_6$)$_{1-3}$ is either a substituent selected from the group consisting of ethyl, $C_1$–$C_2$alkoxy, carboxy and chloro, or denotes 2 or 3 substituents $R_6$, independently of one another selected from the group consisting of $C_1$-$C_2$alkyl, $C_1$-$C_2$alkoxy, carboxy and chloro; or Z is a radical of formula (1f), $R_7$ is as defined for formula (1), and $(R_8)_{1-3}$ denotes 1 to 3 substituents $R_8$, independently of one another selected from the group consisting of hydrogen, $C_1$-$C_2$alkyl, $C_1$-$C_2$alkoxy, carboxy and chloro.

Particularly preferred reactive dyes of formula (1) are those wherein Z is a radical of formula —NH—($CH_2$)$_2$—O—($CH_2$)$_2$—OH, —NH($CH_2$)$_2$—OSO$_3$H, —NH($CH_2$)$_3$—OSO$_3$H or NH—($CH_2$)$_2$—(O—$CH_2CH_2$)$_{2-4}$—OH.

Further particularly preferred reactive dyes of formula (1) are those wherein Z is a radical of formula —N($CH_3$)$CH_2CH_2OH$, —N($CH_3$)($CH_2$)$_2$—O—($CH_2$)$_2$OH, —N($CH_3$)$CH_2CH_2SO_3H$, —N($CH_3$)$CH_2$-$CH_2OSO_3H$, —N($CH_3$)($CH_2$)$_3OSO_3H$, —N($CH_2$-$CH_2OSO_3H$)$_2$ or N—($CH_3$)—$CH_2CH_2$—(O—$CH_2CH_2$)$_{2-4}$—OH.

Still further preferred reactive dyes of formula (1) are those wherein Z is a radical of formula

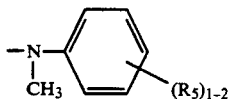

and $(R_5)_{1-2}$ denotes 1 to 2 substituents $R_5$, independently of each other selected from the group consisting of hydrogen, methyl, methoxy and chloro.

Very particularly preferred reactive dyes of formula (1) are those wherein Z is a radical of formula

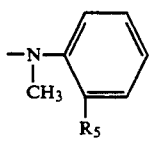

and $R_5$ is hydrogen or methyl.

Also of interest are reactive dyes of formula (1), wherein Z is N-methylanilino, β-chloroethylamino, β-methoxyethylamino, β-ethoxyethylamino, γ-methoxypropylamino, β-sulfatoethylamino, β-(β'-hydroxyethoxy)ethylamino, N-methyl-carboxy-methylamino, N-methyl-β-hydroxyethylamino, N-methyl-β-hydroxy-n-propylamino, N-methyl-β-sulfatoethylamino, N-methyl-β-sulfoethylamino, N-methyl-β-(β'-hydroxyethoxy)ethylamino, N-ethyl-β-hydroxyethylamino, 2,3-dimethylanilino, 2,4-dimethylanilino, 2,5-dimethylanilino, 2,6-dimethylanilino, 3,4-dimethylanilino, 3,5-dimethylanilino, 2,5-dichloroanilino, 2,5-dimethoxyanilino, 3-methyl-6-methoxyanilino, 2,4-disulfoanilino, 2,5-disulfoanilino, 2-methyl-6-sulfoanilino, 2-methyl-5-sulfoanilino, 4-methyl-2-sulfoanilino, 5-methyl-2-sulfoanilino, 4-chloro-2-sulfoanilino, 5-chloro-2-sulfoanilino, 6-chloro-3-sulfoanilino, 6-chloro-4-sulfoanilino, 3,4-dichloro-6-sulfoanilino, 2,5-dichloro-6-sulfoanilino, 2,5-dichloro-4-sulfoanilino, 4-methyl-5-chloro-2-sulfoanilino, 5-methyl-4-chloro-2-sulfoanilino, 4-methoxy-2-sulfoanilino, 5-methoxy-2-sulfoanilino, 6-methoxy-3-sulfoanilino, 6-methoxy-4-sulfoanilino, 6-ethoxy-3-sulfoanilino, 6-ethoxy-4-sulfoanilino, 2,4-dimethoxy-6-sulfoanilino, 2,5-dimethoxy-6-sulfoanilino, 2,5-dimethoxy-4-sulfoanilino, 4-methoxy-2,5-disulfoanilino, 2-methyl-4,6-disulfoanilino, N-methyl-o-toluidino, N-methyl-m-toluidino, N-methyl-p-toluidino, N-methyl-2-ethylanilino, N-methyl-4-chloroanilino, N-methyl-2,5-dimethylanilino, N-methyl-3,4-dimethylanilino, N-methyl-2,5-dimethoxyanilino, N-ethyl-2-ethylanilino, N-ethyl-2-chloroanilino, N-ethyl-4-chloroanilino, N-ethyl-2,5-dimethylanilino, N-ethyl-2,5-dimethoxyanilino, N-sulfomethylanilino, N-β-hydroxyethylanilino, N-β-chloroethylanilino, N-β-cyanoethylanilino, N-β-hydroxyethyl-o-toluidino, N-β-sulfatoethylanilino, N-β-sulfatoethyl-o-toluidino, N-β-hydroxy-n-propylanilino, N-β-hydroxy-n-butylanilino, N-β-hydroxy-n-butyl-2-chloroanilino, γ-ethoxypropylamino, γ-butoxypropylamino, ethanolamino, N,N-di-β-hydroxyethylamino, N-propylethanolamino, N-ethyl-β-sulfatoethylamino, N-ethyl-N-β-(β'-hydroxyethyoxy)ethylamino, HN—($CH_2CH_2$—O)$_2$—$CH_2C$-$H_2$—OH, HN—$CH_2CH_2$—(O—$CH_2CH_2$)$_3$—OH, N-ethyl-m-toluidino, N-ethyl-o-toluidino, N-ethyl-p-toluidino and 2,4,5-trimethylanilino.

The dyes of formula (1) are fibre-reactive, as they contain a removable chlorine atom in the s-triazine radical.

By fibre-reactive compounds are meant those compounds which are able to react with the hydroxyl groups of cellulose or with the amino groups of natural or synthetic polyamides to form covalent chemical bonds.

The reactive dyes of formula (1) are prepared by reacting, in any order, a diazotised diazo component of formula

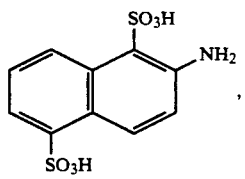

(2)

a coupling component of formula

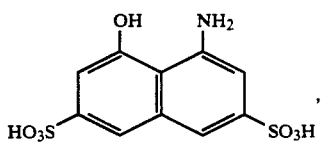

(3)

2,4,6-trichloro-s-triazin and an amine of formula

H—Z    (4), wherein Z is as defined for formula (1), by coupling and condensation, to give a reactive dye of formula (1).

As the individual process steps described above may be carried out in any order, and in some cases also simultaneously, different variants of the process are possible. The starting materials to be used for each partial reaction may be deduced from formula (1). Normally the reaction is carried out stepwise in succession, such that the sequence of the simple reactions between the individual reaction components may be freely chosen.

Important variants of the process of this invention comprise:

1) Coupling a diazotised amino compound of formula (2) with a coupling component of formula (3) to give an azo compound, condensing said azo compound with 2,4,6-trichloro-s-triazine and condensing the primary condensation product with an amino compound of formula (4) to give a reactive dye of formula (1);

2) coupling a diazotised amino compound of formula (2) with a coupling component of formula (3) to give an azo compound, condensing 2,4,6-trichloro-s-triazine with an amino compound of formula (4) and condensing the primary condensation product with the above azo compound to give a reactive dye of formula (1);

3) condensing a coupling component of formula (3) with 2,4,6-trichloro-s-triazine, condensing the primary condensation product with an amino compound of formula (4) and coupling the secondary condensation product with a diazotised amino compound of formula (2) to give a reactive dye of formula (1);

4) condensing a coupling component of formula (3) with 2,4,6-trichloro-s-triazine, coupling the primary condensation product with a coupling component of formula (3) and coupling the secondary condensation product with a diazotised azo compound of formula (2) to give a reactive dye of formula (1);

5) condensing 2,4,6-trichloro-s-triazine with an amino compound of formula (4), condensing the primary condensation product with a coupling component of formula (3), and coupling the secondary condensation product with a diazotised amino compound of formula (2) to give a reactive dye of formula (1).

Representative examples of starting materials which may suitably be used for the preparation of the reactive dyes of formula (1) are:

Amino compound of formula (2), diazo component

2-Amino-1,5-disulfonaphthalene.

Coupling component of formula (3)

1-Amino-8-hydroxynaphthalene-3,6-disulfonic acid 2,4,6-Trichloro-s-triazine

Amines of formula (4)

$\beta$-chloroethylamine, $\beta$-methoxyethylamine, $\beta$-ethoxyethylamine, $\gamma$-methoxypropylamine, $\beta$-sulfatoethylamine, $\beta$-($\beta'$-hydroxyethoxy)ethylamine, N-methylcarboxy-methylamine, N-methyl-$\beta$-hydroxyethylamine, N-methyl-$\beta$-hydroxy-n-propylamine, N-methyl-$\beta$-sulfatoethylamine, N-methyl-$\beta$-sulfoethylamine, N-methyl-$\beta$-($\beta'$-hydroxyethoxy)ethylamine, N-ethyl-$\beta$-hydroxyethylamine, 2,3-dimethylaniline, 2,4-dimethylaniline, 2,5-dimethylaniline, 2,6-dimethylaniline, 3,4-dimethylaniline, 3,5-dimethylaniline, 2,5-dichloroaniline, 2,5-dimethoxyaniline, 3-methyl-6-methoxyaniline, 2,4-disulfoaniline, 2,5-disulfonaniline, 2-methyl-4-sulfoaniline, 2-methyl-5-sulfoaniline, 4-methyl-2-sulfoaniline, 5-methyl-2-sulfoaniline, 4-chloro-2-sulfoaniline, 5-chloro-2-sulfoaniline, 6-chloro-3-sulfoaniline, 6-chloro-4-sulfoaniline, 3,4-dichloro-6-sulfoaniline, 2,5-dichloro-6-sulfoaniline, 2,5-dichloro-4-sulfoaniline, 4-methyl-5-chloro-2-sulfoaniline, 5-methyl-4-chloro-2-sulfoaniline, 4-methoxy-2-sulfoaniline, 5-methoxy-2-sulfoaniline, 6-methoxy-3-sulfoaniline, 6-methoxy-4-sulfoaniline, 6-ethoxy-3-sulfoaniline, 6-ethoxy-4-sulfoaniline, 2,4-dimethoxy-6-sulfoaniline, 2,5-dimethoxy-6-sulfoaniline, 2,5-dimethoxy-4-sulfoaniline, 4-methoxy-2,5-disulfoaniline, 2-methyl-4,6-disulfoaniline, N-methyl-o-toluidine, N-methyl-m-toluidine, N-methyl-p-toluidine, N-methyl-2-ethylaniline, N-methyl-4-chloroaniline, N-methyl-2,5-dimethylanilin, N-methyl-3,4-dimethylanilin, N-methyl-2,5-dimethoxyanilin, N-ethyl-2-ethylaniline, N-ethyl-2-chloroaniline, N-ethyl-4-chloroaniline, N-ethyl-2,5-dimethylaniline, N-ethyl-2,5-dimethoxyaniline, N-sulfomethylaniline, N-$\beta$-hydroxyethylaniline, N-$\beta$-chlorothylaniline, N-$\beta$-cyanoethylaniline, N-$\beta$-hydroxyethyl-o-toluidine, N-$\beta$-sulfatoethylaniline, N-$\beta$-sulfatoethyl-o-toluidine, N-$\beta$-hydroxy-n-propylaniline, N-$\beta$-hydroxy-n-butylaniline and N-$\beta$-hydroxy-n-butyl-2-chloroaniline, $\gamma$-ethoxypropylamine, $\gamma$-butoxypropylamine, ethanolamine, N,N-di-$\beta$-hydroxyethylamine, N-propylethanolamine, N-ethyl-$\beta$-sulfatoethylamine, N-ethyl-N-$\beta$-($\beta'$-hydroxyethoxy)-ethylamine, $H_2N$-$(CH_2CH_2$—$O)_2$—$CH_2CH_2H_2N$—$CH_2CH_2$—$(O$—$CH_2CH_2)_3$—$OH$, N-ethyl-m-toluidine, N-ethyl-o-toluidine, N-ethyl-p-toluidine and 2,4,5-trimethylaniline.

The diazotisation of the diazo components is normally effected by treatment with nitrous acid in an aqueous solution of mineral acid at low temperature, and the coupling to the coupling components is carried out in the weakly acid, neutral or weakly alkaline pH range.

The condensation reactions of the 2,4,6-trichloro-s-triazine with the amino-monoazo compounds and the amino compounds of formula (4) are preferably carried out in aqueous solution or suspension at low temperature and in the weakly acid, neutral or weakly alkaline pH range, such that one chlorine atom still remains as removable group in the final reactive dye of formula (1). The hydrogen chloride which evolves during the condensation is conveniently neutralised by the continuous addition of an aqueous alkali metal hydroxide, carbonate or bicarbonate. Isolation of the dichlorotriazine azo compound is normally dispensed with.

The reactive dyes of formula (1) can be isolated and processed to useful dry dyeing formulations. Isolation is preferably effected at as low temperature as possible by salting out and filtration. The dyes isolated by filtration can be dried after the optional addition of extenders and/or buffers, for example after the addition of a mixture of equal parts of mono- and disodium phosphate. Drying is preferably carried out at not too elevated temperature and under reduced pressure. In certain cases, the dry dye fomulations of this invention can be prepared direct by spray drying the entire reaction mixture, i.e. without first isolating the dyes.

The invention therefore also relates to storage-stable, concentrated, liquid formulations of the reactive dyes of formula (1) and to the use thereof for the preparation of pad liquors, dyebaths and, preferably, print pastes, which are used for dyeing and printing fibre materials, especially cellulosic fibre materials.

Liquid dye formulations have advantages over powder formulations, for example no dust formation when preparing print pastes and pad and dye liquors, no wetting problems caused by lump formation, no specky dyeings resulting from undissolved dye particles. Such liquid formulations should be highly concentrated (at least 10% by weight and preferably more than 15% by weight of dye) and should be storable for several months over a wide temperature range ($-10°$ to $+40°$ C.) without undergoing physical changes.

As starting solution or suspension for preparing the dye formulations it is possible to use the aqueous solution or suspension obtained direct from the synthesis and which may contain solvent, or an aqueous slurry of the moist press or filter cake of the crude dyes containing varying amounts of undesired dissolved substances of low molecular weight, especially by-products formed during the synthesis of the dye and dissolved inorganic and organic salts. Whenever the condensation product cannot be salted out, or can only be salted out with the greatest difficulty, it is also possible to use the crude condensation or neutralisation solution direct. It is convenient to use starting solutions or suspensions which contain from 2 to 50% of dye.

A start may also, however, be made from the dry powder of the crude dye if it is first suspended in water.

The concentrated liquid formulations of this invention preferably contain 20 to 50% by weight, most preferably 30 to 50% by weight, of dye.

The concentrated liquid formulations of the invention are normally true or colloidal solutions. They are of low viscosity (viscosity of ca. 5 to 300 cP/20° C.) and have good storage stability, i.e. they remain in the ready for use state for at least several months in the temperature range from $-20°$ to $+60°$ C., preferably from $-10°$ to $+40°$ C. The formulations can be used for preparing pad liquors, dyebaths and print pastes with water as well as with organic solvents and/or thickners, without precipitation of the dye or the occurrence of other phenomena which adversely affect the homogeneity of the formulations. The pad liquors, dyebaths and print pastes so obtained can be used for dyeing or printing textile materials made from natural or synthetic fibre materials, preferably cellulosic fibre materials, in known manner.

The stable, concentrated liquid formulations of this invention are especially suitable for the preparation of print pastes for printing cellulosic materials as well as for continuous dyeing methods.

A process for the preparation of a formulation of this invention is disclosed, for example, in European patent application 0 333 656, wherein the dye salt is deionised and concentrated in a reverse osmosis unit.

It is known to use membrane filtration techniques for preparing formulations of water-soluble organic dyes. The process starts from the aqueous suspension of the crude dye, which is substantially freed from water-soluble by-products and its salt concentration reduced by about half by means of a first membrane separation process. A second membrane separation process is then carried out.

The soluble by-products and some of the salts flow through a membrane in this first separation process, whereas the dye and water-insoluble constituents are retained. In the second membrane separation process, the dye suspension-which may be diluted with water-is then deionised and concentrated and, finally, converted into a commercial liquid or solid dye formulation.

The dye solutions used in the practice of this invention usually have a dye concentration of 5 to 20% by weight and a salt content (inorganic salts) of 1 to 20% by weight, preferably of 1 to 10% by weight. The pH is normally in the range from 3 to 10, preferably from 3 to 9. Insoluble matter is separated by microfiltration, and the concentration and deionisation is carried out until a dye concentration of 10 to 50% is attained. The salt concentration falls to below 5% by weight, for example from 0.05 to 5% by weight, and preferably to below 1% by weight, for example 0.05 to 1% by weight.

To prepare a commercial liquid form, the concentrated aqueous dye formulation will be brought to a predetermined final dye concentration only by dilution and/or with the aid of extenders, after the optional addition of customary components of liquid formulations, for example solubilisers, foam inhibitors, antifreeze agents, humectants, surfactants, buffer substances and/or microbicides, and adjusting the pH. The dye formulation can also, however, be converted into a solid formulation by hydroextraction, after the optional addition of auxiliaries such as binders, dust inhibitors, wetting agents, buffer substances such as alkali metal polyphosphates, disodium hydrogenphosphate, citric acid and/or ethylenediaminetetraacetic acid, and/or extenders. Owing to the increased concentration of dye, less energy is needed for drying. Conventional drying methods are used, especially spray drying.

The pH of the commercial liquid formulation of the reactive dyes is usually adjusted by addition of buffer substances. The pH is in the range from ca. 7.0 to 8.5, preferably 8.0.

It will be readily understood by those skilled in the art that the cited auxiliaries can be added not only before the final formulation to a commercial form, but even before or during the process of this invention to the solution of the crude dye, so that at least some of said auxiliaries (for example solubilisers, solvents, surfactants and the like) are already present in the dye solution from which the final commercial form is prepared. Addition during the process is, of course, only feasible if the auxiliaries are not completely removed again from the solution by one of the membrane separation processes.

The concentrated liquid formulations of the reactive dyes of formula (1) thus contain 10 to 50% by weight of dye, 0.05 to 5% by weight of an inorganic salt such as NaCl, KCl, LiCl, an amount of buffer substance sufficient to adjust the pH to the range from 7.0 to 8.5, for example mono- and disodium phosphate or sodium tripolyphosphate or a mixture of buffer substances, as well as water.

The reactive dyes of formula (1) are distinguished by high reactivity and they give dyeings of good light- and wetfastness properties. It is to be singled out for special mention that the dyes have good solubility and excellent fixation, that they diffuse readily into the cellulose fibres, and that unfixed dye can be easily washed off.

The reactive dyes of formula (1) are suitable for dyeing and printing a very wide range of materials such as silk, leather, wool, polyamide fibres and polyurethanes, but especially cellulosic materials of fibrous structure such as linen, cellulose, regenerated cellulose and, preferably, cotton. They are suitable for dyeing by the exhaust process as well as by the pad dyeing process, in which the goods are impregnated with an aqueous dye solution which may also contain salts, and the dye is fixed after a treatment with alkali or in the presence of alkali, with or without the application of heat.

The reactive dyes of formula (1) are particularly suitable for printing textile cellulosic fibre materials, preferably cotton, but also for printing nitrogen-containing fibres such as wool, silk or blends which contain wool.

It is advisable to rinse the dyeings and prints thoroughly with cold and hot water, with or without the addition of an agent which acts as a dispersant and promotes the diffusion of unfixed dye.

For use in actual practice, the dyes are used with advantage as liquid dye or print formulations.

The dyes of this invention are either in the form of the free sulfonic acids or, preferably, of salts thereof.

Suitable salts are typically the alkali metal salts, alkaline earth metal salts or ammonium salts or the salts of an organic amine. Exemplary of such salts are the sodium, lithium, potassium or ammonium salts or the salt of triethanolamine.

The preparation of the monoazo intermediate is not always described in the following preparatory Examples, but it may be readily inferred from what has been stated above.

In the following Examples parts are by weight. The relationship between parts by weight and parts by volume is the same as that between the gram and the cubic centimeter.

EXAMPLE 1

31.9 g of 1-amino-8-hydroxynaphthalene-3,6-disulfonic acid are dissolved in 100 ml of water by adding 50 ml of 2N sodium hydroxide solution. This solution is then slowly added dropwise to an ice-cold suspension of 18.5 g of 2,4,6-trichloro-1,3,5-triazine in 200 ml of water. Then 50 ml of 2N sodium hydroyxide solution are added over 2 to 3 hours such that the pH of the reaction mixture always remains 1. To the primary condensation product so obtained is then added an aqueous solution of 10.7 g of N-methylaminobenzene in hydrochloric acid. The pH is kept at 3-4 with 2N sodium hydroxide solution, and the temperature is slowly allowed to rise to 35° C.

30.3 g of 2-naphthylamine-1,5-disulfonic acid are diazotised in conventional manner in the presence of hydrochloric acid and 6.9 g of sodium nitrite. The diazo component is then added to the above prepared suspension of the reactive coupling component at 0°-5° C. and the pH of the coupling mixture is kept at 7-8 with a 20% solution of sodium carbonate. After stirring for 1 hour, the temperature is allowed to rise to 20° C. The dye is salted out with sodium chloride, isolated by filtration, washed, and dried at 40° C. under vacuum to give the dye of formula

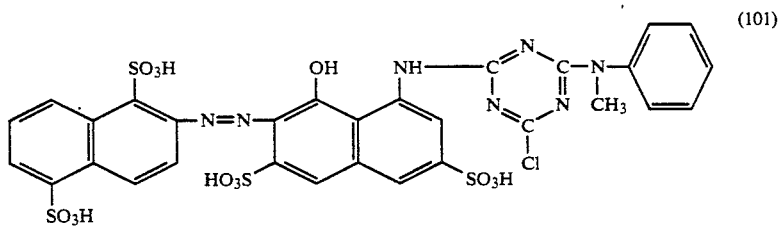

(101)

which is in the form of the free acid and dyes cotton in bluish-red shades.

A further preparatory method comprises adding the acid primary condensation product of 1-amino-8-hydroxynaphthalene-3,6-disulfonic acid and 2,4,6-trichloro-1,3,5-triazine at 5°-15° C. and pH 7 to an aqueous emulsion of N-methylaminobenzene which contains an emulsifier and water. The condensation is complete after 1.5 hours and the dye is obtained as described above in this Example in the same purity and yield.

Following the same procedure of this Example, but using in place of N-methylaniline equivalent amounts of the amines listed in column 2 of the Table below to replace the second chlorine atom at the triazine ring, useful dyes which dye cotton in red shades are also obtained.

| Example No. | Amine | Shade |
|---|---|---|
| 2 | β-chloroethylamine | red |
| 3 | β-methoxyethylamine | red |
| 4 | β-ethoxyethylamine | red |
| 5 | γ-methoxypropylamine | red |
| 6 | β-sulfatoethylamine | red |
| 7 | β-(β'-hydroxyethoxy)ethylamine | red |
| 8 | N-methylcarboxymethylamine | red |
| 9 | N-methyl-β-hydroxyethylamine | red |
| 10 | N-methyl-β-hydroxy-n-propylamine | red |
| 11 | N-methyl-β-sulfatoethylamine | red |
| 12 | N-methyl-β-sulfoethylamine | red |
| 13 | N-methyl-β-(β'-hydroxyethoxy)ethylamine | red |
| 14 | N-ethyl-β-hydroxyethylamine | red |
| 15 | 2,3-dimethylaniline | red |
| 16 | 2,4-dimethylaniline | red |
| 17 | 2,5-dimethylaniline | red |
| 18 | 2,6-dimethylaniline | red |
| 19 | 3,4-dimethylaniline | red |
| 20 | 3,5-dimethylaniline | red |
| 21 | 2,5-dichloroaniline | red |
| 22 | 2,5-dimethoxyaniline | red |
| 23 | 3-methyl-6-methoxyaniline | red |
| 24 | aniline-2,4-disulfonic acid | red |
| 25 | aniline-2,5-disulfonic acid | red |
| 26 | 2-aminotoluene-4-sulfonic acid | red |
| 27 | 2-aminotoluene-5-sulfonic acid | red |
| 28 | 1-amino-4-methylbenzene-2-sulfonic acid | red |
| 29 | 1-amino-5-methylbenzene-2-sulfonic acid | red |
| 30 | 1-amino-4-chlorobenzene-2-sulfonic acid | red |
| 31 | 1-amino-5-chlorobenzene-2-sulfonic acid | red |
| 32 | 1-amino-6-chlorobenzene-3-sulfonic acid | red |
| 33 | 1-amino-6-chlorobenzene-4-sulfonic acid | red |
| 34 | 1-amino-3,4-dichlorobenzene-6-sulfonic acid | red |
| 35 | 1-amino-2,5-dichlorobenzene-6-sulfonic acid | red |
| 36 | 1-amino-2,5-dichlorobenzene-4-sulfonic acid | red |
| 37 | 1-amino-4-methyl-5-chlorobenzene-2-sulfonic acid | red |
| 38 | 1-amino-5-methyl-4-chlorobenzene-2-sulfonic acid | red |
| 39 | 1-amino-4-methoxybenzene-2-sulfonic acid | red |
| 40 | 1-amino-5-methoxybenzene-2-sulfonic acid | red |
| 41 | 1-amino-6-methoxybenzene-3-sulfonic acid | red |
| 42 | 1-amino-6-methoxybenzene-4-sulfonic acid | red |
| 43 | 1-amino-6-ethoxybenzene-3-sulfonic acid | red |
| 44 | 1-amino-6-ethoxybenzene-4-sulfonic acid | red |
| 45 | 1-amino-2,4-dimethoxybenzene-6-sulfonic acid | red |
| 46 | 1-amino-2,5-dimethoxybenzene-6-sulfonic acid | red |
| 47 | 1-amino-2,5-dimethoxybenzene-4-sulfonic acid | red |
| 48 | 1-amino-4-methoxybenzene-2,5-disulfonic acid | red |
| 49 | 1-amino-2-methylbenzene-4,6-disulfonic acid | red |
| 50 | N-methyl-o-toluidine | red |
| 51 | N-methyl-m-toluidine | red |
| 52 | N-methyl-p-toluidine | red |
| 53 | N-methyl-2-ethylaniline | red |
| 54 | N-methyl-4-chloroaniline | red |
| 55 | N-methyl-2,5-dimethylaniline | red |
| 56 | N-methyl-3,4-dimethylaniline | red |
| 57 | N-methyl-2,5-dimethoxyaniline | rot |
| 58 | N-ethyl-2-ethylaniline | red |
| 59 | N-ethyl-2-chloroaniline | red |
| 60 | N-ethyl-4-chloroaniline | red |
| 61 | N-ethyl-2,5-dimethylaniline | red |
| 62 | N-ethyl-2,5-dimethoxyaniline | red |
| 63 | N-sulfomethylaniline | red |
| 64 | N-β-hydroxyethylaniline | red |
| 65 | N-β-chloroethylaniline | red |

-continued

| Example No. | Amine | Shade |
|---|---|---|
| 66 | N-β-cyanoethylaniline | red |
| 67 | N-β-hydroxyethyl-o-toluidine | red |
| 68 | N-β-sulfatoethylaniline | red |
| 69 | N-β-sulfatoethyl-o-toluidine | red |
| 70 | N-β-hydroxy-n-propylaniline | red |
| 71 | N-β-hydroxy-n-butylaniline | red |
| 72 | N-β-hydroxy-n-butyl-2-chloroaniline | red |
| 73 | H$_2$NCH$_2$CH$_2$CH$_2$OC$_2$H$_5$ | red |
| 74 | H$_2$NCH$_2$CH$_2$CH$_2$OC$_4$H$_9$ | red |
| 75 | H$_2$NCH$_2$CH$_2$OH | red |
| 76 | HN(CH$_2$CH$_2$OH)$_2$ | red |
| 77 | NHCH$_2$CH$_2$OH<br>\|<br>C$_3$H$_7$ | red |
| 78 | HNCH$_2$CH$_2$OSO$_3$H<br>\|<br>C$_2$H$_5$ | red |
| 79 | HNCH$_2$CH$_2$OCH$_2$CH$_2$OH<br>\|<br>C$_2$H$_5$ | red |
| 80 | H$_2$N(CH$_2$CH$_2$O)$_2$CH$_2$CH$_2$OH | red |
| 81 | H$_2$NCH$_2$CH$_2$—(O—CH$_2$CH$_2$)$_3$—OH | red |
| 82 | H$_2$N—CH$_2$CH$_2$—(O—CH$_2$CH$_2$)$_4$—OH | red |
| 83 | 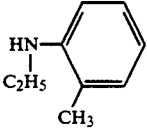 | red |
| 84 | 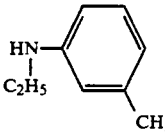 | red |
| 85 | 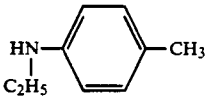 | red |
| 86 | 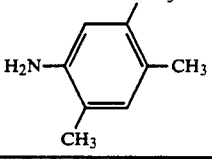 | red |

Dyeing Instruction 1

2 Parts of the dye obtained in Example 1 are dissolved at 20°–50° C. in 100 parts of water by adding 5 to 20 parts of urea and 2 parts of anhydrous Na$_2$CO$_3$. A cotton fabric is impregnated with this solution to a pick-up of 60–80% and then dried. Afterwards the dyed fabric is thermofixed for 1½ to 5 minutes in the temperature range from 140° to 210° C., subsequently soaped at the boil for ¼ hour in a 0.1% solution of a nonionic detergent, rinsed, and dried.

Dyeing Instruction 2

2 Parts of the dye obtained in Example 1 are dissolved at 75° C. in 2000 parts of water by adding 120 parts of NaCl or anhydrous Na$_2$SO$_4$. Then 100 parts of cotton fabric are put into this dyebath and the temperature is kept constant for 30–60 minutes. Then 10 parts of anhydrous Na$_2$CO$_3$ and 4 ml of aqueous sodium hydroxide (36%) are added. The temperature is kept for a further 45–60 minutes at 75°–80° C., and the fabric is soaped at the boil for 15 minutes in a 0.1% solution of a nonionic detergent, rinsed, and dried.

Dyeing Instruction 3

2 Parts of the dye obtained in Example 1 are dissolved in 100 parts of water with the addition of 0.5 part of sodium m-nitrobenzenesulfonate. A cotton fabric is then impregnated with a warm solution of 20° C. which contains 5 g/l of sodium hydroxide and 300 g/l of sodium chloride, and thereafter expressed to a pick-up of 75%. The dyeing is steamed for 30 seconds at 100°–101° C., rinsed, soaped at the boil for ¼ hour in a 0.3% solution of a nonionic detergent, rinsed, and dried.

Dyeing Instruction 4

2 Parts of the dye obtained in Example 1 are dissolved in 100 parts of water. The solution is added to 1900 parts of cold water, 60 parts of sodium chloride are added, and 100 parts of cotton fabric are put into this dyebath. The temperature is raised to 60° C. and 40 parts of anhydrous Na$_2$CO$_3$ and another 60 parts of sodium chloride are added after 30 minutes. The temperature is kept for 30 minutes at 60° C. The dyeing is rinsed and then soaped at the boil for 15 minutes in a 0.3% solution of a nonionic detergent, rinsed, and dried.

Printing Instruction 1

With rapid stirring, 2 parts of the dye obtained in Example 1 are strewed into 100 parts of a stock thickening which comprises 45 parts of 5% sodium alginate thickener, 32 parts of water, 20 parts of urea, 1 part of sodium m-nitrobenzenesulfonate, and 2 parts of sodium carbonate. A cotton fabric is printed on a roller printing machine with the print paste so obtained. The printed fabric is steamed for 4 to 8 minutes at 100° C. in saturated steam and then thoroughly rinsed with cold and hot water, such that chemically unfixed dye can be very easily washed off from the fabric, and subsequently dried.

Printing Procedure 2

With rapid stirring, 6 parts of the reactive dye of formula (101) obtained in Example 1 are strewed into 94 parts of a stock thickening comprising 50 parts of 5% sodium alginate thickener, 39.4 parts of water, 3.5 parts of sodium propionate, 1 part of sodium m-nitrobenzenesulfonate and 0.1 part of aqueous formaldehyde solution. Mercerised cotton fabric is printed with this print paste, dried, and steamed for 8 minutes at 103° C. in saturated steam. The printed fabric is then rinsed and dried. A red print is obtained.

What is claimed is:

1. A reactive dye of formula

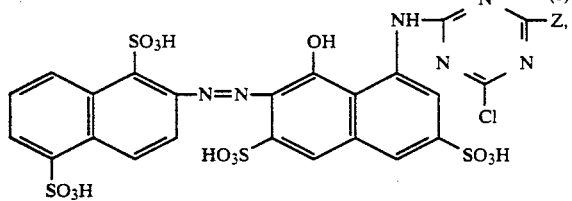

wherein Z is a radical of formula

—NH—R$_1$, (1a)

—N(R$_2$)R$_3$, (1b)

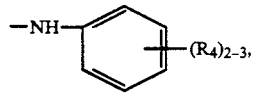 (1c)

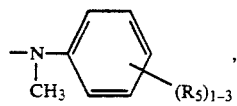 (1d)

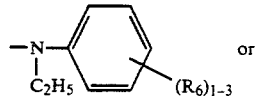 or (1e)

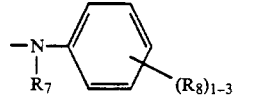 (1f)

and R$_1$ is C$_1$-C$_6$alkyl which is substituted by C$_1$-C$_4$alkoxy, hydroxy-C$_2$-C$_4$alkoxy, HO—(CH$_2$CH$_2$—O)$_{2-4}$—, C$_2$-C$_5$alkanoyl, C$_1$-C$_4$alkoxycarbonyl, C$_1$-C$_4$alkylcarbonyloxy, cyano, halogen or sulfato, [R$_2$ is C$_1$-C$_6$alkyl which may be substituted by C$_1$-C$_4$alkoxy, hydroxy-C$_2$-C$_4$alkoxy, HO—(CH$_2$CH$_2$—O)$_{2-4}$—, C$_1$-C$_4$alkoxycarbonyl, C$_2$-C$_5$alkanoyl, C$_1$-C$_4$alkylcarbonyloxy, carboxy, cyano, halogen, sulfo or sulfato, R$_3$ is C$_1$-C$_6$alkyl which is substituted by hydroxy, C$_1$-C$_4$alkoxy, hydroxy-C$_2$-C$_4$alkoxy, C$_2$-C$_5$alkanoyl, C$_1$-C$_4$alkoxycarbonyl, C$_1$-C$_4$alkylcarbonyloxy, carboxy, cyano, halogen, sulfo or sulfato, (R$_4$)$_{2-3}$ denotes 2 or 3 substituents R$_4$, independently of one another selected from the group consisting of C$_1$-C$_4$alkyl, C$_1$-C$_4$alkoxy, halogen and sulfo, (R$_5$)$_{1-3}$ denotes 1 to 3 substituents R$_5$, independently of one another selected from the group consisting of hydrogen, C$_1$-C$_4$alkyl, C$_1$-C$_4$alkoxy, carboxy and halogen, (R$_6$)$_{1-3}$ is either a substituent R$_6$ selected from the group consisting of C$_2$-C$_4$alkyl, C$_1$-C$_4$alkoxy carboxy and halogen, or denotes 2 or 3 substituents R$_6$, independently of one another selected from the group consisting of C$_1$-C$_4$alkyl, C$_1$-C$_4$alkoxy, carboxy and halogen,] R$_7$ is C$_1$-C$_4$alkyl which is substituted by halogen, hydroxy, cyano, carboxy, C$_1$-C$_4$alkoxy, hydroxy-C$_2$-C$_4$alkoxy, sulfo or sulfato, and (R$_8$)$_{1-3}$ denotes 1 to 3 substituents R$_8$, independently of one another selected from the group consisting of hydrogen, C$_1$-C$_4$alkyl, C$_1$-C$_4$alkoxy, carboxy and halogen.

2. A reactive dye according to claim 1, wherein Z is a radical of formula (1a), and R$_1$ is C$_1$-C$_4$alkyl which is substituted by hydroxy-C$_2$-C$_4$alkoxy, HO—(CH$_2$CH$_2$—O)$_{2-4}$— or sulfato.

3. A reactive dye according to claim 1, wherein Z is a radical of formula (1f), R$_7$ is as defined for formula (1), and (R$_8$)$_{1-3}$ denotes 1 to 3 substituents R$_8$, independently of one another selected from the group consisting of hydrogen, C$_1$-C$_2$alkyl, C$_1$-C$_2$alkoxy, carboxy and chloro.

4. A reactive dye according to claim 2, wherein Z is a radical of formula —NH—(CH$_2$)$_2$—O—(CH$_2$)$_2$—OH, —NH(CH$_2$)$_2$—OSO$_3$H, —NH(CH$_2$)$_3$—OSO$_3$H or NH—(CH$_2$)$_2$—(O—CH$_2$CH$_2$)$_{2-4}$—OH.

* * * * *

UNITED STATES PATENT AND TRADEMARK OFFICE
CERTIFICATE OF CORRECTION

PATENT NO. : 5,136,028
DATED : August 4, 1992
INVENTOR(S) : Herbert Seiler

It is certified that error appears in the above-identified patent and that said Letters Patent is hereby corrected as shown below:

Column 13, delete all of lines 15-31; line 40 should read "bonyloxy, cyano, halogen or sulfato,";

Column 14, delete all of lines 1-18; line 19 should read "$R_7$ is $C_1$-$C_4$ alkyl which is substituted by halo-".

Signed and Sealed this

Thirteenth Day of September, 1994

Attest:

BRUCE LEHMAN

Attesting Officer      Commissioner of Patents and Trademarks